June 15, 1965 R. E. COATS ETAL 3,189,168
DRIVE FOR AUGER ELEVATOR
Filed Sept. 6, 1962 5 Sheets-Sheet 1
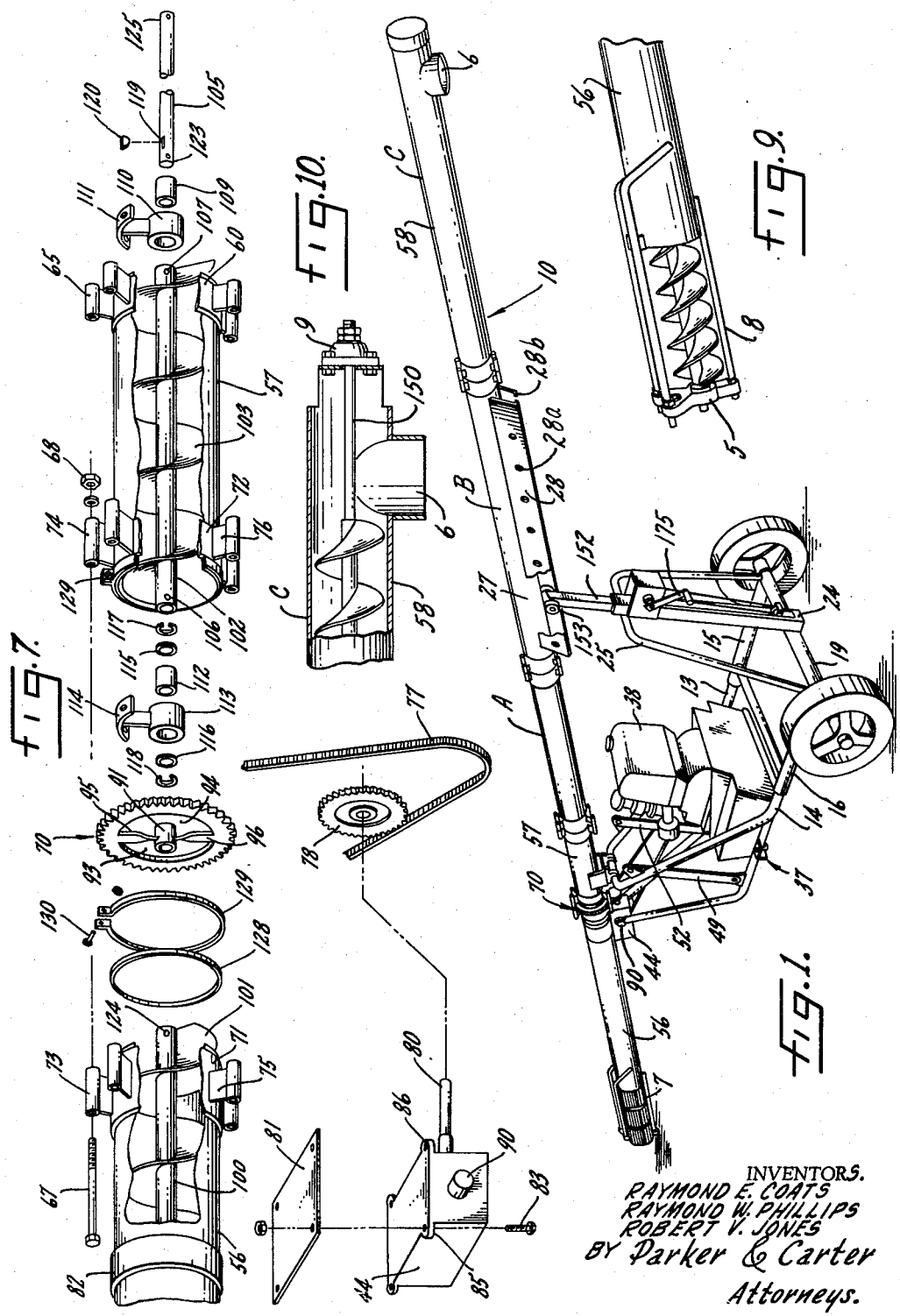
INVENTORS.
RAYMOND E. COATS
RAYMOND W. PHILLIPS
ROBERT V. JONES
BY Parker & Carter
Attorneys.

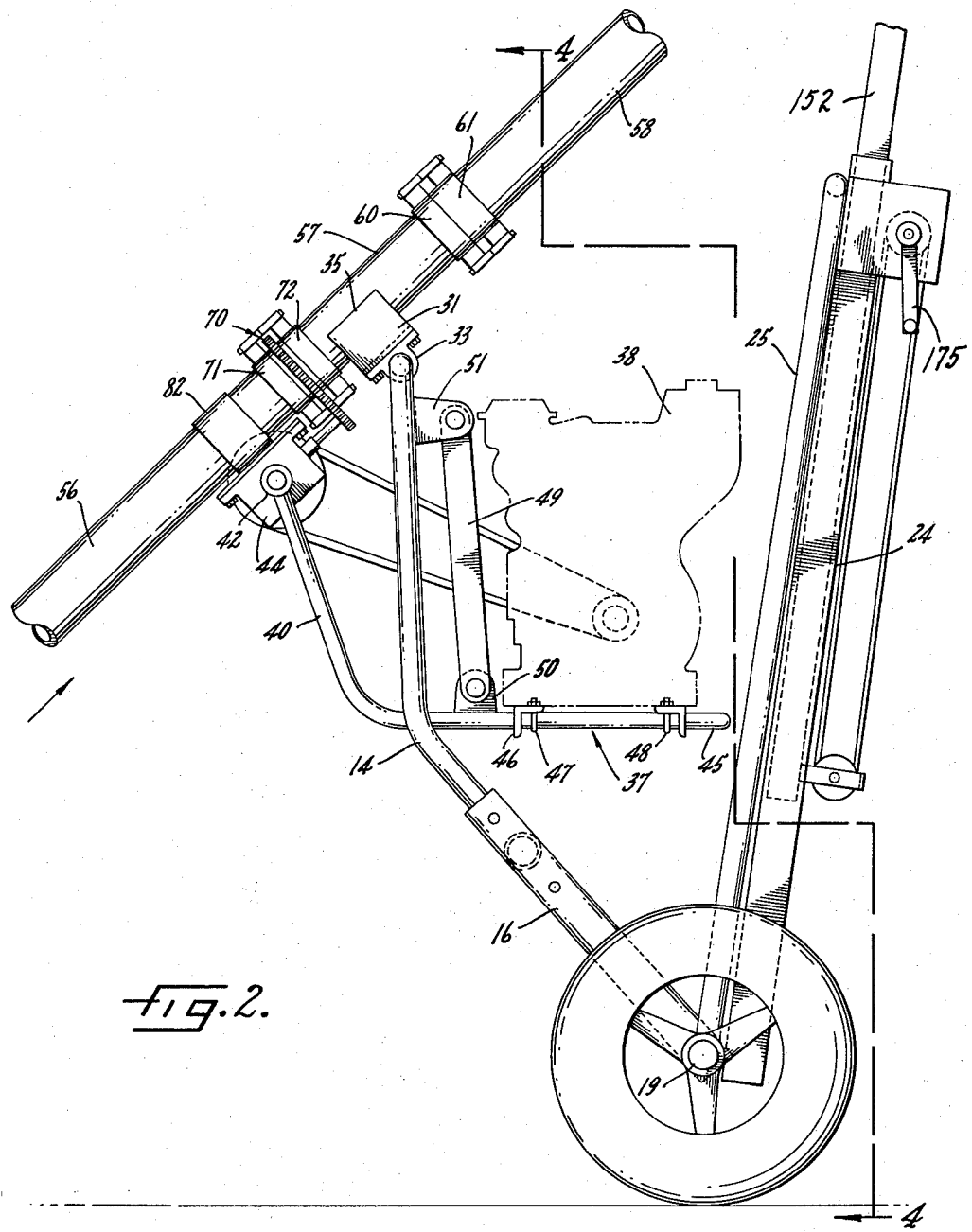

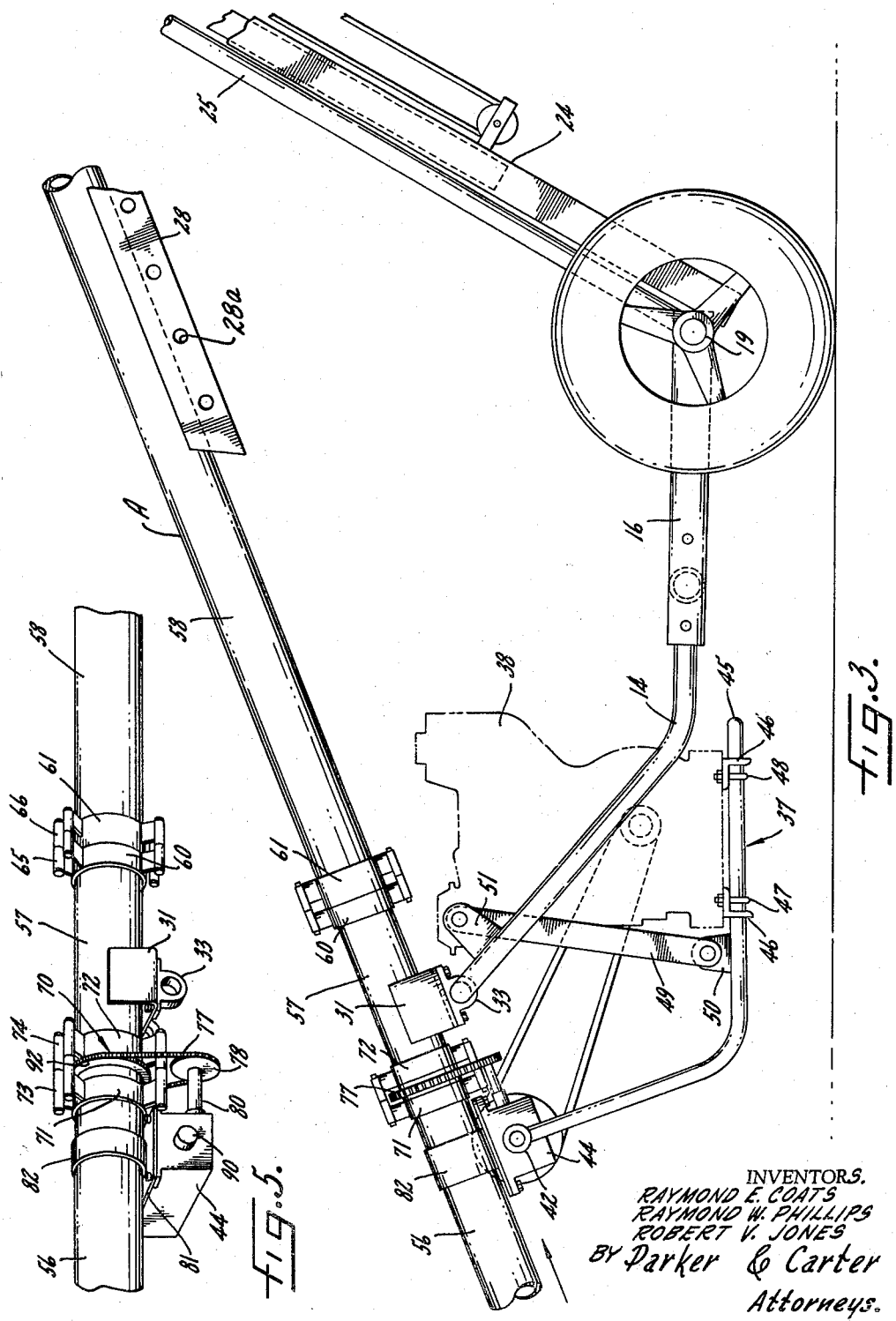

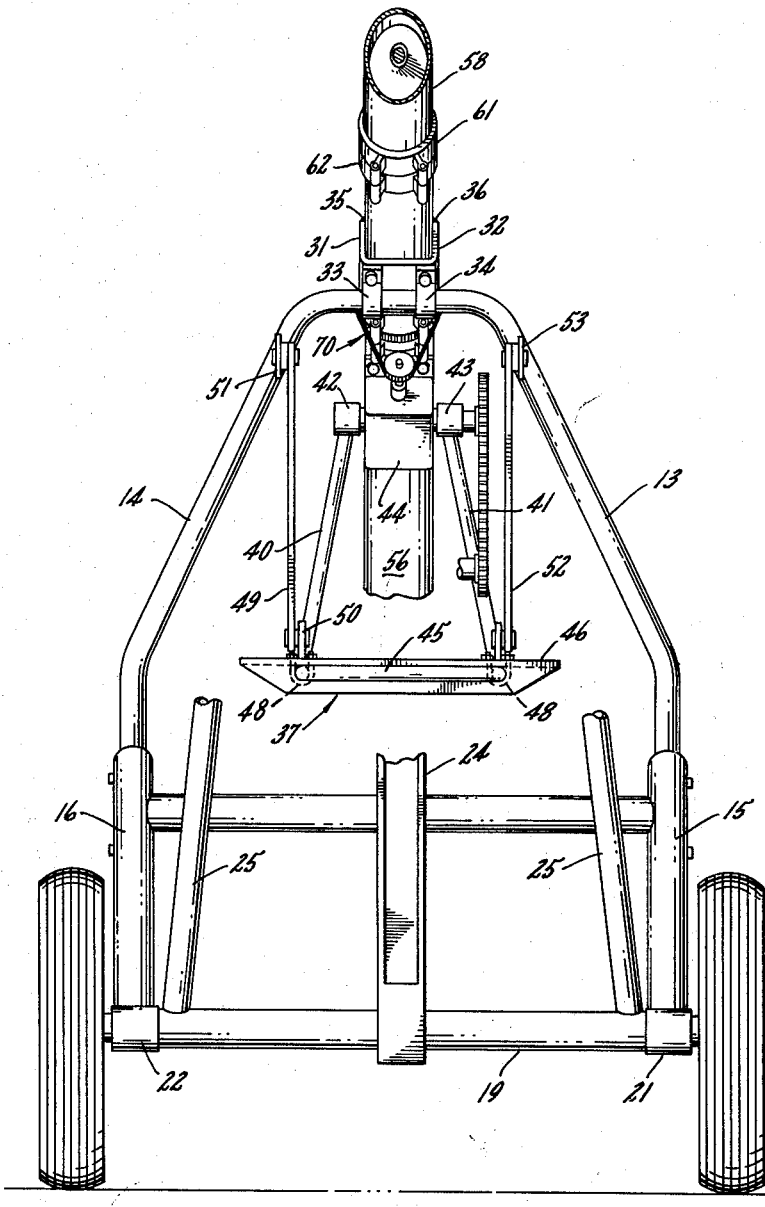

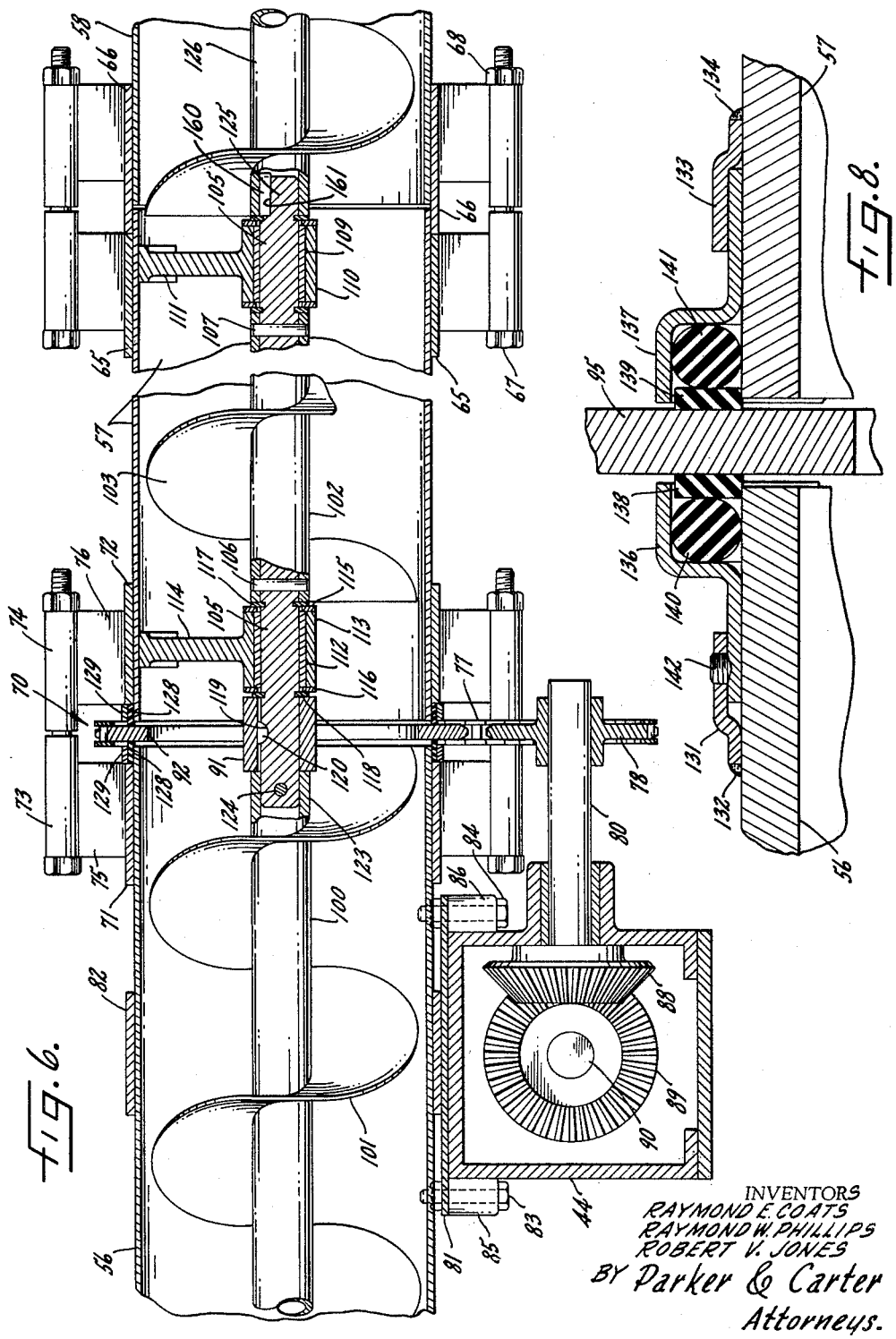

United States Patent Office 3,189,168
Patented June 15, 1965

3,189,168
DRIVE FOR AUGER ELEVATOR
Raymond E. Coats and Raymond W. Phillips, Sac City, Iowa, and Robert V. Jones, Chicago, Ill., assignors to Noble Manufacturing Company, Sac City, Iowa, a corporation of Iowa
Filed Sept. 6, 1962, Ser. No. 221,704
10 Claims. (Cl. 198—213)

This invention relates to grain conveyors and, particularly, to an auger elevator driven intermediate its ends.

An object of this invention is a grain conveyor having separable auger segments and separable housing sections, for conveyors of a wide range of lengths.

Another object is a grain conveyor having separate housing sections and separate auger segments assembled on each side of a driven sprocket wheel so as not to obstruct passage of grain through the elevator.

Another object is a grain conveyor driven intermediate its ends and having a drive and auger elevator assembly having a driving element which does not obstruct the passage of grain through the conveyor housing.

Another object is a grain conveyor having auger segments which include auger shafts keyed to hollow portions of auger tubes.

Another object is a grain conveyor having a sprocket wheel between the ends of adjoining housing sections that is rotatably sealed by overlapping resilient means abutting the sides of the sprocket wheel.

Another object is a grain conveyor unit having a conveyor housing of adjustable angle and length fixed to a frame unit which holds a repositionable motor mounting to accommodate any changes in length and angle.

Another object is a mobile grain conveyor having an adjustable frame to provide various support points for changes in length of the conveyor housing, and an undercarriage supporting a repositionable motor mounting to accommodate changes in the angular position of the conveyor housing.

The foregoing objects are realized along with other objects, which will become apparent, by the invention which will be described in detail and which is illustrated in the accompanying drawings wherein:

FIGURE 1 is a perspective view of the mobile grain elevator;

FIGURE 2 is a fragmentary view on an enlarged scale of the frame unit and the motor undercarriage;

FIGURE 3 is a fragmentary view on an enlarged scale of the frame unit and motor undercarriage in another position;

FIGURE 4 is an end view of the frame unit and motor undercarriage with parts removed;

FIGURE 5 is a perspective view of the drive assembly between adjacent housing sections;

FIGURE 6 is a side section view through the drive assembly;

FIGURE 7 is an exploded perspective of the drive and auger assembly;

FIGURE 8 is a partial sectional view of a modified sealing means for the drive assembly;

FIGURE 9 is a detail of the intake end; and

FIGURE 10 is a detail sectional view of the outlet end.

The auger or grain elevator or lifting device herein shown includes a basic section with a drive, and one or more extension sections, to provide a conveyor which can be used through a wide range of angles and a wide range of lengths. Considering, for example, FIGURE 1, the basic section, the intake or receiving section, includes a lower tube or housing 56, an upper tube or housing 57, each having an auger or helicoid within it, and a drive, in this instance a sprocket, the sprocket being shown as extending outwardly between the upper end of the tube 56 and the lower end of the tube 57. Both helicoids, as is shown in some detail, for example, in FIGURE 7, and later described in greater detail, are rotated by the sprocket 70 by driving means later described. Thus the material picked up by the exposed end of the lower helicoid, as shown in FIGURE 9, is carried upwardly through the tubes or housings 56 and 57 and passes the sprocket 70 without interference. The material so elevated or delivered is then carried upwardly through whatever additional sections are used. To the basic intake or pickup section one or more extension sections or tubes may be secured, each with its auger length or helicoid conveyor. Three such tubes are indicated, as at A, B and C in FIGURE 1. While we do not wish to be limited to specific sizes, we find it convenient to use a basic unit or pickup of the order of 11 feet long and to add supplemental units or extensions which are 10 feet long. An intermediate length of 5 feet may also be used. Regardless of dimensions, these being given merely illustratively, it will be understood that to the basic intake unit one or more supplemental units or extension units may be applied, the various units or their tubes being connected by, for example, nuts and bolts, as illustrated in FIGURE 7.

In order to transport, and to support and elevate, the conveyor unit we employ a mobile main frame or supporting unit. This unit may include spaced frame angle members 13, 14, adjustably telescoped and adapted to be secured at desired adjustments in the larger members 15 and 16. Thus the effective length of the main frame unit may be varied to adapt itself to a substantial range of conveyor lengths. The larger members 15, 16 are secured to the axle 19. The other ends of the main frame angle members 13, 14 are linked to brackets 31, 32, as at pivots 33, 34. These brackets may be secured to opposite sides of a housing section by a weld seam 35, 36. An elevating structure or windlass 24 is fixed to the axis and to a cross-brace member 25. The upper element or lifter 152 has top rollers 153 which ride between tracks 28. These tracks may be provided with a plurality of adjustment apertures 28a through which any suitable abutment elements, bolts or the like, may be passed, depending upon the length of the conveyor and the desired angle of final lift. It will be understood that the rollers 153 ride between and on the inturned portions 28b of the tracks 28. The stops or limit members can be inserted at any desired point by selecting the proper apertures 28a. Thus when the crank 175 is operated to raise the member 152 that member and the rollers 153, after riding along the tracks 28, abut a stop. Once they have abutted the stop, further rotation of the crank 175 elevates the member 152 and tilts the conveyor assembly about its axial connection with the main frame.

The main frame unit has a motor mounting or undercarriage generally shown at 37 which holds a motor 38. Spaced undercarriage angle members 40, 41 are linked at one of their ends by pivots 42, 43 to a gear or transmission box 44. One side of the undercarriage angle members are generally level and are joined by a continuous cross member 45. This level portion forms, as it were, a shelf for a slidable mounting platform 46 which is laterally positioned on the shelf by depending studs such as 47, 48. The motor platform and the motor mounted thereon may thus slide along the shelf of the undercarriage. A linking arm 49 is pivotally connected to a lug 50 fixed to the platform, and is pivotally connected to another lug 51 fixed to a frame angle member. Another linking arm 52 similarly connects the platform of the undercarriage to a lug 53 fixed to the other frame angle member. The foregoing pivotal linkage points permit the frame and undercarriage to be changed to another selected position, as shown in FIGURE 3, to accommodate changes in the angular position of the grain conveying housing.

It will be understood, of course, that many changes may be made in the main frame unit and in the motor support, it being primarily important that the proper supporting means for the motive power be provided and that the main frame be adjustable to adapt it to various lengths of conveyor. Where extremely long conveyor lengths are required it may be advantageous to actually substitute a longer main frame.

It is characteristic of our structure that the conveying elements or helicoids or auger sections for the entire conveyor are driven by a single application of power, this being the power applied by the sprocket wheel 70. This sprocket, as shown in FIGURE 7, may include a pair of diametrically opposed spokes 95, 96, which are inclined or formed to conform generally to the contours of the adjacent auger or helix members. There is thus a minimum resistance of the flow of material through the sprocket wheel, and, specifically, through the openings 93 and 94 thereof. The drive unit is shown, for example, in FIGURES 5, 6 and 7. The sprocket wheel 70 being positioned between the two housing sections or tubes 56 and 57, we find it advantageous to connect the tubes or connections together by supporting elements or collars 71, 72. Radial outward projections or fins 75, 76 carry sleeves 73, 74 through which any suitable bolts or locking members pass, such as are shown at 67, 68, for example, in FIGURE 7. The ends of the tubes 56 and 57 are thereby connected firmly together but are spaced apart sufficiently to permit clearance for the outer circumference of the sprocket 70. Similar connecting means may be employed for the adjacent ends of other sections, it being desirable that the fins or radial members 75, 76 be so spaced that the sections or tubes can be connected together only in one predetermined relationship. Any suitable drive for the sprocket wheel may be employed, but we provide a sprocket chain 77 connecting the sprocket wheel to a transmission sprocket 78.

The transmission sprocket is shown conveniently connected to a gear or transmission box by a shaft 80. The gear box is fixed to the lowered housing section by a plate 81 which may be welded to an annular band 82. The gear box is secured to the plate by bolts such as 83, 84 fixing the plate to ears 85, 86 extending from the gear box. The transmission within the gear box may include a bevel gear or the like 88 meshing with gear 89 which is driven by a shaft 90 connected to the motor by the driving belt. The gear box may also have a shaft which is fixed to a sheave or grooved wheel and belt which lead to the driving motor mounted on the undercarriage of the frame.

The auger or helicoid in the lower housing section 56 includes an axial auger tube 100 to which is fixed a helicoid blade 101. In the adjacent section 57 is an auger tube 102 to which is secured the helicoid blade 103. To drive these two helicoid sections or lengths in response to rotation of the sprocket wheel 70 we employ a shaft 105 which enters at its lower end the tube 100, and which extends axially along and through the shaft 102. It is keyed to the sprocket wheel hub, for example, by a Woodruff key arrangement 119, 120. Thus, in response to rotation of the sprocket wheel 70, the shaft 105 rotates. It is pinned or connected to the lower helicoid tube 100, as at 124, and it is pinned to the upper helicoid tube 102, as at 106, 107. Thus the rotation of the sprocket wheel rotates the helicoid lengths or conveyors in the lower tubes 56 and 57. To provide bearings for the structure above described we may employ the bearing arrangement shown, for example, in FIGURE 6, although we do not wish to be limited to these specific bearing arrangements. As shown, one end of the auger shaft 105 rides in a bearing 109 which rotates in the cylinder 110 of the bearing support 111. The bearing support is fixed to the upper interior of the shorter housing section 57 by bolts or others means not shown in detail. The lower end of the shaft 105 rides in a bearing 112 and rotates in a cylinder 113 of the similar bearing support 114. This support may be secured to the upper interior of the tube 57 by means not shown in detail. Bearing 112 may, for example, be held within the cylinder of the bearing support by washers 115, 116 and snap rings 117, 118. Thus the shaft 105 is directly driven by the sprocket wheel 70 and, in turn, directly drives both auger lengths of the lower or pickup section formed by the tubes 56, 57.

It will be understood that other auger tubes and auger shafts may be assembled to provide "add-on" auger segments to increase the length of the grain elevator. Likewise, other housing sections of desired length may be locked together by means such as locking collars described herein.

It will be seen that there is a small clearance between the ends of the first housing section, the adjacent shorter housing section and the rim 92 of the sprocket. This clearance may be in the order of only $\frac{1}{32}$ of an inch but such clearance is effectively closed by annular resilient means such as a band 128 which projects over the end of, say, housing section 56 and abuts the surface of the rim of the sprocket. The resilient band prevents leakage of the grain passing through the housing and permits low-frictional rotation with the abutting rim of the sprocket wheel. The resilient band is preferably fixed to the housing as by a ring 129 which may be locked at its free end by a nut and bolt 130. A similar resilient band and locking ring is shown assembled on the end of the shorter adjacent housing section so that it will abut the other side of the sprocket wheel rim. The resilient band may be formed from a variety of materials such as natural rubber, synthetic rubber, of which neoprene is an example, soft plastics, of which low-frictional tetrafluoroethylene is a particularly useful form, and other materials.

In FIGURE 8 another form of resilient sealing means is shown. It is seen that a lowered offset holding plate 131 is fixed to the first housing section by means such as a weld 132, and another lowered offset plate 133 is fixed to the shorter adjacent housing section by weld means such as 134. Raised annular offset plates 136, 137 are positioned and fixed in their respective lowered offset plates. Resilient annular bands 138, 139 are urged against opposite faces of the sprocket rim by sealing O-rings 140, 141. A set screw such as 142 may be placed in one of the lowered offset plates to position the raised offset plate in contact therewith at a desired degree of tension against the sprocket.

Consider now the driving connection for the "add-on" or supplemental lengths, and the avoidance of end thrust against the sprocket wheel, or of any thrust of the sprocket wheel against adjacent ends of the tubes 56 or 57. As shown in FIGURE 9, the lower end of the lower helicoid section is received in any suitable bearing structure 5 mounted on or held by any suitable bracket or support 8. However, any suitable guard may be employed, as indicated at 7 in FIGURE 1. It will be understood that any end thrust caused by the rotation of the helicoid and the elevation or conveyance of the load is taken by and at the bearing 5.

The various helicoids of the upper sections may be made with axial tubes, as in connection with 100 and 102. These various tubes may be connected together by means not herein shown in detail, it being understood that the helicoids or conveying elements of the "add-on" sections A, B and C rotate as a unit. The connection between such a unit and the drive shaft 105 and the sprocket wheel 70 may be the same regardless of the number of units involved. A practical connection is shown at the right side of FIGURE 6. Therein the shaft 126 is illustrated with an interior key 160 which slides in or enters a slot 161 formed in the end of the shaft 105. Thus the end 125 of the shaft 105 serves as a positive drive for the helicoid next above, but without transmitting any end thrust to the sprocket wheel 70. The end thrust for the entire upper system is taken by the adjustable end bearing 9 shown at the right side of FIGURE 10. Preferably, a rod 150 enters and is welded or otherwise secured to the axial tube of the uppermost helicoid. All end thrust is taken by the bearing 9, which may be adjusted by any suitable means in order to insure a relative positioning of the lower end tube 126 in relation to the upper end 125 of the shaft 105, as shown in FIGURE 6. As a matter of convenience, the helicoid in the upper tube 58 terminates just short of the downspout 6 through which the elevated material may be delivered.

The use and operation of the invention are as follows:

The basic unit may be considered the intake unit or pickup unit, which includes the tubes 56 and 57 of FIGURE 1. Between these two units, of which the unit 57 is shortest, is located drive mechanism for the helicoid conveyor shown, for example, in FIGURES 3, 5 and 6. The driving sprocket includes arms or spokes 95 and 96 which are inclined or screw-formed in order to conform generally to the contours of the helicoids 101 and 103. Thus the driving sprocket constitutes no real interruption to the feeding movement of the grain or material handled. Rotation of the sprocket rotates the shaft 125, one end of which is keyed or pinned, as at 124, to the hollow shaft 100 of the helicoid in the lowest or intake section 56. Similarly, the opposite end of the shaft 125 is pinned, as at 106, to the hollow shaft of the short helicoid section in the tubular element 57. Thus 56 and 57, taken together, constitute an intake section in which the helicoid conveyor is rotated through the sprocket above described by the chain 77 and the motor 38. Whereas in FIGURE 1 a guard is shown as at 7, it will be understood that, basically, the lower end of the helicoid extends outwardly beyond the lower edge of the tube 56 and is inserted into the material to be handled, so that it can pick it up and move it upwardly along the tube or section 56. A guard is advantageous, however, for preventing accidents. It should be kept in mind that the end thrust of the helicoid shaft 100 is taken by any suitable bearing means located at the lower end of the section 56. The sprocket does not have to take any end thrust, and there is therefore no tendency of an end thrust against the upper edge or end of the tube 56.

Assuming the intake unit above described, any suitable number of additional sections may be added, to suit the desires of the particular purchaser or user. As a matter of convenience, several 10-foot sections may be applied, each 10-foot section having within it the appropriate helicoid, typically, a hollow tube with the surrounding helix welded or otherwise secured to it. While it is a convenience to have uniform sections of, let us say, a 10-foot length, any suitable smaller sections or half-sections may be employed. 5-foot sections may, for example, be practical. Whatever the number of these upper sections, we prefer to have the end thrust taken by any suitable bearing at the upper end of the discharge section. In FIGURE 1 we illustrate three of these upper sections, as at A, B and C. The hollow tubes of the individual sections may be welded or otherwise secured together. The end thrust of the upper portion of the auger system is taken by a rod 150 which may be welded or otherwise secured to the hollow shaft of the uppermost helicoid. It, in turn, may be supported, as to end thrust, by the adjustable bearing 9, mounted on any suitable plate bracket or crosspiece. Preferably, the upper helicoid terminates at or just short of the discharge outlet 6.

We find it advantageous to prevent any downward end thrust by having the upper end of the rod or bar 105 in a slip connection with the adjacent lower end of the hollow tube 126 of the helicoid next above. As shown in FIGURE 6, as a matter of convenience the tube 126 has a key 160 welded or secured therewithin, which slides in a slot 161 formed in the upper end of the rod 105. Longitudinal adjustment of the upper helix or group of helices may be obtained by any suitable adjusting means, such as the adjustable bearing 9, above described.

In the use of the device it will be understood that the tracks or elements 28 may be welded or otherwise secured to one or more of the sections A, B, C. The location of these tracks will depend upon the desired length of the conveyor as a whole. It would, under some circumstances, be convenient to have the tracks secured to the unit A. Under other circumstances, it might be secured to the unit B, if the over-all conveyor length is to be greater. The tracks 28 are provided with a plurality of apertures 28a into which suitable abutments may be positioned. Such an abutment may consist of a bolt or any other suitable crosspiece. At the upper end of the thrust element 24 we may locate one or more rollers which ride between the tracks 28, but cannot escape downwardly from them because the tracks are inwardly recurved or bent toward each other, as at 28b. Depending upon the location of the abutment inserted in the desired aperture, or pair of apertures, 28a, the initial operation of the crank 175 of FIGURE 1 results in thrusting the member 152, with its rollers 153, along the tracks. When they reach the abutment any further operation of the crank 175 results in an elevating movement of the tubular auger container as a whole. This elevating movement takes place about the axis 90 of the gear box 44. The undercarriage structure shown, for example, in FIGURE 1, may be widely varied. However, it is desired to have the members 13, 14 telescoping in relation to 15, 16 so that the effective length of the undercarriage can be varied to suit various sizes or lengths of conveyor.

We find it advantageous to so arrange the connecting tubes or bolt-receiving tubes, such as 73, 74, 75, 76, in such fashion as to insure that the tubes or elements 56, 57, 58, etc., can be assembled only in a predetermined relationship. Thus when longitudinally welded tube stock is used it is advantageous to have the tubes so arranged that they have to be connected with the seam or seams up.

Our system provides a very simple arrangement whereby a single basic unit may be employed, to which any desired number of extension units may be applied. It also provides a simple undercarriage structure which is adaptable to a wide variation in over-all conveyor length. In conveyors of extreme length it may be necessary to provide an undercarriage of extra length. However, with, let us say, two undercarriages we can accommodate any desired range of conveyor length which would normally be called for.

The foregoing conveyor housing is intended to have an undercarriage 37 supporting a motor mount proximate to a gear box 44 fixed to the bottom of the housing. The power from the motor will be transferred from the gear box to the sprocket placed between the ends of the housing. Since the advantages of the housing include the characteristics of lowering and raising the housing in addition to extending the length of the housing, it is further provided that the motor mounting may be repositioned to accommodate such changes. A motor is mounted on the undercarriage frame by being positioned on a platform 46 movable on a shelf portion of the frame. The undercarriage frame is linked to the mobile frame by pivotal linkage arms 48, 52 fixed at one of their ends to the platform and at their other ends to the mobile or main frame. This permits the platform to move back and forth. The main frame is shown pivoted at 50, 53 to brackets fixed to housing section 57. This linkage, together with the linkage of the undercarriage frame to the gear box, permits the motor mounting to be lowered and raised. The foregoing versatile arrangement leads to a grain conveyor in which the housing section may be raised and lowered to various angles and the mounted motor may be adjustably changed so that the drive belt connecting the gear box and the motor does not become slack or lose its desired tension.

It is further provided that various stability points may be selected for connecting the windlass of the mobile frame to the housing sections. Assume that the tracks 28 are secured to one of the sections or tubes, a suitable stop, or stops, may be inserted in the desired aperture 28a to provide an anchor or limit for the rollers 153 and the upper thrust member 152. The stop will be positioned in its proper relation to the over-all length of the conveyor tube. It will be understood that the shorter the over-all conveyor length the nearer the tracks 28 are positioned to the base section 56, 57.

It will be realized that many changes may be made in size, shape, number and disposition of parts without departing from the spirit of our invention. The details of the supporting carriage or main frame may be widely varied. The number and length of the supplemental or "add-on" sections may be widely varied. It is important, however, to prevent end thrust or axial thrust against the sprocket wheel 70.

We claim:

1. An intermediately driven conveyor unit for moving material along a substantially uninterrupted flow path, said unit including, in combination
    an upper and a lower auger housing disposed in axially aligned, spaced relationship one to the other,
    each housing having a substantially constant internal diameter,
    an auger in each housing, each of said augers including a centrally located core member,
    said core members being disposed in axially aligned, space relationship to one another,
    means exteriorly connecting the upper and lower housings in spaced relationship to one another to thereby define a material flow path of substantially constant diameter, and
    means for driving the augers concurrently to thereby move the material within the housing along an uninterrupted path of movement spanning the gap between the opposed housing ends, said driving means firstly including,
    means for connecting the opposed auger core members to one another in torque transmitting relationship, and secondly,
    a drive member having a power input point located radially outwardly from the periphery of the material flow path,
    said drive member having generally radially inwardly disposed extension means joined to the torque connection means for relative movement with respect thereto axially, and for conjoint movement with the torque connection means in a circular direction, and
    means for supporting the core members of the auger with respect to the auger housings,
    said means including auger thrust bearing means,
    said thrust bearing means being located a substantial distance from, and flanking, the driving means whereby axial thrust on the augers will bypass the driving means.

2. The apparatus of claim 1 further characterized in that the opposed, axially aligned ends of the auger housings are spaced apart a distance substantially greater than the axial length of the driving means, and further including
    resilient means disposed between the auger housings and drive member, and in abutting relation with the latter, and closing the gap therebetween.

3. The apparatus of claim 2 further characterized in that the resilient means are bands of material having the general characteristics, with respect to resiliency and distortability, of rubber,
    one band on each side of the drive member, and
    clamping means for clamping each band to an associated auger housing and maintaining it in engagement with the drive member.

4. The apparatus of claim 1 further characterized in that the generally radially inwardly disposed extension means are joined to the torque connection means by a key and slot arrangement which provides sufficient relative sliding movement with the torque connection means to enable axial thrust to bypass said extension means.

5. The apparatus of claim 4 further characterized in that the generally radially inwardly disposed extension means includes an arm which is at least partially formed along its radial length to follow the general configuration of the auger convolutions.

6. The apparatus of claim 1 further including
    additional auger housing means, each having an auger,
    connecting means for securing the additional auger housing means to the upper housing to thereby increase the length of the structure as desired, and
    an under carriage having a pivotal connection to the unitary structure formed by the upper and lower housings, and an elevating connection with the additional auger housing means.

7. The apparatus of claim 6 further characterized in that the under carriage has an extensible frame, and further including
    means for adjusting the location of the elevating connection in an axial direction along the additional auger housing means.

8. The apparatus of claim 1 further characterized in that the drive member is a sprocket wheel adapted to be driven from a remote source of power,
    said sprocket wheel having a hub portion which is interiorly keyed to the torque transmission connection means.

9. The apparatus of claim 1 further characterized in that the torque transmission connection means includes
    a rod like member spanning the gap between the opposed ends of the upper and lower housings, and
    means for connecting each housing to the rod like member for rotation therewith, and thereby for rotation with each other.

10. The apparatus of claim 1 further characterized in that the means for supporting the core members are bearings carried by supports which extend radially inwardly from the top of the substantially constant diameter flow path.

References Cited by the Examiner

UNITED STATES PATENTS

| 1,401,155 | 12/21 | Jacoby | 198—213 |
| 2,103,145 | 12/37 | Carter | 198—213 |
| 2,360,776 | 10/44 | Kozak | 198—213 |
| 2,533,261 | 12/50 | Howe | 198—233 |
| 2,607,472 | 4/52 | Senstock | 198—233 |
| 2,610,727 | 9/52 | Beldin | 198—213 |
| 2,769,526 | 11/56 | Herscovitch | 198—213 |
| 2,845,167 | 7/58 | Heiken | 198—213 |
| 2,998,123 | 8/61 | Kooiker | 198—213 |

SAMUEL F. COLEMAN, Primary Examiner.

WILLIAM B. LA BORDE, Examiner.